United States Patent
Koch et al.

(10) Patent No.: US 11,674,063 B2
(45) Date of Patent: Jun. 13, 2023

(54) EPOXY RESIN ADHESIVE COMPOSITIONS

(71) Applicant: DDP SPECIALTY ELECTRONIC MATERIALS US, LLC, Wilmington, DE (US)

(72) Inventors: Felix Koch, Horgen (CH); Andreas Lutz, Horgen (CH); Beda Steiner, Horgen (CH); Cathy Grossnickel, Horgen (CH); Jeannine Flueckiger, Horgen (CH)

(73) Assignee: DDP Specialty Electronic Materials US, LLC, Wilmington, DE (US)

( * ) Notice: Subject to any disclaimer, the term of this patent is extended or adjusted under 35 U.S.C. 154(b) by 148 days.

(21) Appl. No.: 16/956,803

(22) PCT Filed: Dec. 7, 2018

(86) PCT No.: PCT/US2018/064455
§ 371 (c)(1),
(2) Date: Jun. 22, 2020

(87) PCT Pub. No.: WO2019/135857
PCT Pub. Date: Jul. 11, 2019

(65) Prior Publication Data
US 2021/0062054 A1 Mar. 4, 2021

Related U.S. Application Data

(60) Provisional application No. 62/614,660, filed on Jan. 8, 2018.

(51) Int. Cl.
*C09J 163/00* (2006.01)
*C08G 59/40* (2006.01)
*B32B 15/092* (2006.01)
*B32B 27/20* (2006.01)
*B32B 27/26* (2006.01)
*B32B 27/28* (2006.01)
*C08K 3/22* (2006.01)

(52) U.S. Cl.
CPC .............. *C09J 163/00* (2013.01); *C08K 3/22* (2013.01); *C08K 2003/2296* (2013.01); *C08K 2201/005* (2013.01); *C08K 2201/011* (2013.01)

(58) Field of Classification Search
CPC ...... C09J 163/00; B32B 15/092; B32B 27/20; B32B 27/26; B32B 27/38; C08G 59/4021
USPC ................ 523/427, 428, 440, 442, 457, 458
See application file for complete search history.

(56) References Cited

U.S. PATENT DOCUMENTS

| | | |
|---|---|---|
| 4,734,332 A | 3/1988 | Bagga et al. |
| 5,112,932 A | 5/1992 | Koenig et al. |
| 5,202,390 A | 4/1993 | Mulhaupt et al. |
| 5,258,427 A | 11/1993 | Stuart |
| 5,278,257 A | 1/1994 | Mulhaupt et al. |
| 7,615,595 B2 | 11/2009 | Lutz et al. |
| 7,625,977 B2 | 12/2009 | Lutz et al. |
| 7,642,316 B2 | 1/2010 | Rego et al. |
| 9,925,729 B2 | 3/2018 | Sang et al. |
| 11,248,145 B2 | 2/2022 | Czaplicki |
| 2002/0115736 A1* | 8/2002 | Koshy ................. C08J 9/32 528/88 |
| 2005/0070634 A1 | 3/2005 | Lutz et al. |
| 2005/0209401 A1 | 9/2005 | Lutz et al. |
| 2006/0194910 A1* | 8/2006 | Miyatake ............ C01G 9/02 524/432 |
| 2006/0276601 A1 | 12/2006 | Lutz et al. |
| 2010/0019539 A1 | 1/2010 | Nakamura et al. |
| 2011/0190419 A1* | 8/2011 | Wittenbecher ...... C07C 279/16 523/400 |
| 2011/0224329 A1 | 9/2011 | Gong et al. |
| 2011/0257299 A1 | 10/2011 | Aoyama et al. |
| 2015/0319858 A1 | 11/2015 | Aoyama et al. |
| 2016/0298002 A1 | 10/2016 | Dai et al. |
| 2018/0334596 A1 | 11/2018 | Lutz et al. |
| 2019/0241772 A1* | 8/2019 | Zhao .................... C09J 9/02 |

FOREIGN PATENT DOCUMENTS

| | | |
|---|---|---|
| CN | 103987751 A | 8/2014 |
| EP | 0458521 | 11/1991 |
| EP | 1 632 533 | 3/2006 |
| JP | H04227984 A | 8/1992 |
| JP | 2011516675 A | 5/2011 |
| JP | 2012514660 A | 6/2012 |
| JP | 2012514661 A | 6/2012 |
| JP | 2018530642 A | 10/2018 |
| WO | 2005/070634 | 8/2005 |
| WO | 2005/118734 | 12/2005 |
| WO | 2006/128722 | 12/2006 |
| WO | 2010078688 | 7/2010 |
| WO | 2013073563 A1 | 5/2013 |
| WO | 2017044401 | 3/2017 |
| WO | WO-2018002064 A1 * | 1/2018 ............ C09J 11/04 |

OTHER PUBLICATIONS

"Study on Properties of Nano-ZnO Modified Polyurethane Coatings" by Zhang Haifeng, (China Paint) vol. 24 No. 10, pp. 50-52.
Manluo, He; "Epoxy Resin Adhesives", Version 1, p. 113, China Petrochemical Press.
"Catalogue of China Chemical and Petroleum Products", Version 1, p. 922, Chemical Industry Press.

* cited by examiner

Primary Examiner — Michael J Feely

(57) ABSTRACT

Disclosed are one-component epoxy resin adhesive compositions which include (a) one or more non-rubber-modified epoxy resins; (b) one or more latent epoxy curing agents; (c) one or more toughening agents; and (d) zinc oxide nanoparticles. The one-component epoxy resin adhesive compositions exhibit improved toughness of the adhesive as measured by its lap shear strength as well as improved environmental stability, i.e., corrosion protection, by addition of the zinc oxide nanoparticles when applied to metal substrates.

14 Claims, No Drawings

EPOXY RESIN ADHESIVE COMPOSITIONS

FIELD

The present invention relates to epoxy resin adhesive compositions containing zinc oxide nanoparticles.

BACKGROUND

Structural adhesives are utilized in a wide variety of applications to bond together two or more substrate materials. For example, structural adhesives may be used for bonding together automotive or industrial components.

One example of a structural adhesive is epoxy adhesive compositions. These compositions are reaction adhesive compositions comprising an epoxy resin, a curing agent and usually a latent accelerator. Upon heating, the epoxy groups of the epoxy resin react with the curing agent linking the epoxy resin compounds by a polyaddition reaction to obtain a cured product.

Epoxy-based thermoset adhesives are favorable structural adhesives due to their physical and mechanical properties, excellent chemical resistance, and high glass transition temperature. While the pure epoxy adhesives are brittle, the addition of a toughener can render the adhesives crash durable or semi crash durable, respectively, thereby tolerating high impact.

In addition to the foregoing benefits of epoxy-based thermoset adhesives, they also adhere very well to metals. This adhesion is especially important for the long term stability of the joint under corrosive conditions, which is evaluated by cyclic corrosion testing. The corrosion requirement of the automotive industry on adhesively bonded joints are becoming more stringent. Typically, a lap shear strength decrease of less than 40% is required after a cyclic climate storage of typically 3 to 6 months (according to cyclic corrosion testing PV1210).

Presently, there is a challenge for reducing the loss of lap shear strength of an adhesively bonded joint after artificial aging. Besides the loss of adhesion of an epoxy-based thermoset adhesive to the metal surface, there is another way for loss of lap shear strength after artificial aging. Specifically, this is the loss of adhesion due to the metal surface being corroded followed by dissolution during artificial weathering. This corrosion and dissolution results in an adhesion loss of the adhesive to the substrate as well.

The steels currently used in automotive industry typically possess a protective zinc-layer. Even though zinc is oxidized more easily than iron, it still helps to protect against corrosion due to a dense thin oxide layer on its surface resulting in passivation of the bulk material. However, the thin zinc oxide layer can be dissolved under basic conditions leaving the bulk zinc exposed to environmental conditions, thereby resulting in corrosion.

Thus, it is desired to provide an epoxy resin adhesive composition which has sufficient lap shear strength while also protecting against corrosion when bonding a zinc coated metal substrate to another substrate.

SUMMARY

In one illustrative embodiment, a one-component epoxy resin adhesive composition is provided which comprises:
(a) one or more non-rubber-modified epoxy resins;
(b) one or more latent epoxy curing agents;
(c) one or more toughening agents; and
(d) zinc oxide nanoparticles.

In one illustrative embodiment, a method for bonding two substrates is provided, which comprises:
(a) applying a one-component epoxy resin adhesive composition to at least a portion of a first substrate, wherein the one-component epoxy resin adhesive composition comprises:
(i) one or more non-rubber-modified epoxy resins;
(ii) one or more latent epoxy curing agents;
(iii) one or more toughening agents; and
(iv) zinc oxide nanoparticles;
(b) contacting a second substrate with the first substrate; and
(c) curing the one-component epoxy resin adhesive composition to form an adhesive bond between the first and second substrates.

In one illustrative embodiment, a method for providing corrosion protection to a metal substrate having a zinc-containing layer thereon is provided, which comprises forming a layer of the one-component epoxy resin adhesive composition at a bondline between a first metal substrate having a zinc-containing layer thereon and a second metal substrate, and curing the layer at the bondline to form a cured adhesive bonded to each of the substrates.

The one-component epoxy resin adhesive composition of the present invention advantageously exhibits improved toughness of the adhesive as measured by its lap shear strength as well as improved environmental stability, i.e., corrosion protection, by addition of the zinc oxide nanoparticles.

DETAILED DESCRIPTION

Disclosed is a one-component epoxy resin adhesive composition which comprises: (a) one or more non-rubber-modified epoxy resins; (b) one or more latent epoxy curing agents; (c) one or more toughening agents; and (d) zinc oxide nanoparticles.

The component (a) of the one-component epoxy resin adhesive composition according to the present invention includes one or more non-rubber-modified epoxy resins. In general, a wide range of epoxy resins can be used as the non-rubber-modified epoxy resin. In one embodiment, the non-rubber-modified epoxy resin can have an average of at least 1.5 epoxide groups per molecule or at least 1.8 epoxide groups per molecule. The epoxy resin(s) are not rubber-modified, meaning that, prior to curing the adhesive, the epoxy resins are not chemically bonded to a rubber.

Suitable non-rubber-modified epoxy resins include, for example, those described at column 2, line 66 to column 4, line 23 of U.S. Pat. No. 4,734,332, incorporated herein by reference in its entirety. For example, a suitable non-rubber-modified epoxy resin includes those containing at least two groups of formula:

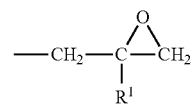

directly attached to an atom or atoms of oxygen, nitrogen, or sulphur, and wherein $R^1$ denotes a hydrogen atom or a methyl group.

Representative examples of such non-rubber-modified epoxy resins include polyglycidyl and poly(beta-methylglycidyl) esters obtainable by reaction of a compound containing two or more carboxylic acid groups per molecule with epichlorohydrin, glycerol dichlorohydrin, or beta-methyl-epichlorohydrin in the presence of an alkali. Such polyglycidyl esters may be derived from aliphatic carboxylic acids such as oxalic acid, succinic acid, glutaric acid, adipic acid, pimelic acid, suberic acid, azelaic acid, sebacic acid, and a dimerized or trimerized linoleic acid; or from cycloaliphatic polycarboxylic acids such as tetrahydrophthalic acid, 4-methyltetrahydrophthalic acid, hexahydrophthalic acid, and 4-methylhexahydrophthalic acid; or from aromatic polycarboxylic acids such as phthalic acid, isophthalic acid, and terephthalic acid.

Further representative examples of such non-rubber-modified epoxy resins include polyglycidyl and poly(beta-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from, for example, acyclic alcohols such as ethylene glycol, diethylene glycol, and higher poly(oxyethylene)glycols, propane-1,2-diol and poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol, sorbitol, and poly-epichlorohydrins; or from cycloaliphatic alcohols such as resorcitol, quinitol, bis(4-hydroxycyclohexyl)methane, 2,2-bis (4-hydroxyc yclohexyl)propane, and 1,1-bis(hydroxymethyl)cyclohex-3-ene; and from alcohols having aromatic nuclei such as N,N-bis(2-hydroxyethyl)aniline and p,p'-bis (2-hydroxyethylamino)diphenylmethane.

These ethers may also be made from, for example, mononuclear phenols, such as resorcinol and hydroquinone, or from polynuclear phenols, such as bis(4-hydroxyphenyl)methane, 4,4'-dihydroxydiphenyl, bis(4-hydroxyphenyl)sulphone,1,1,2,2-tetrakis(4-hydroxyphenyeethane, 2,2-bis (4-hydroxyphenyl)-propane, 2,2-bis(3,5-dibromo-4-hydroxyphenyl) propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, e.g., 4-chlorophenol,2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, m-xylylenediamine, and bis(4-methyl-aminophenyl)methane; triglycidyl isocyanurate; and N,N'-diglycidyl derivatives of cyclic alkylene ureas, such as ethylene urea and 1,3-propylene urea, and of a hydantoin such as 5,5-dimethylhydantoin. Poly(S-glycidyl) compounds include, for example, di-S-glycidyl derivatives of dithiols such as ethane-1,2-dithiol and bis(4-merc aptomethylphenyl) ether.

Suitable non-rubber-modified epoxy resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis (5,5-dimethyl-1-glycidylhydantoin-3-yl)propane.

In one embodiment, the one or more non-rubber-modified epoxy resins are liquid epoxy resins such as, for example, polyglycidyl ethers, polyglycidyl esters, N,N'-diglycidylhydantoins, and poly(N-glycidyl) derivatives of aromatic amines In one embodiment, the one or more non-rubber-modified epoxy resins are polyglycidyl ethers of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, bis(4-diglycidylamino)phenyl)methane, and p-(diglycidylamino)phenyl glycidyl ether.

In one embodiment, suitable one or more non-rubber-modified epoxy resins include, for example, diglycidyl ethers of polyhydric phenol compounds such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol; diglycidyl ethers of aliphatic glycols such as the diglycidyl ethers of $C_2$ to $C_{24}$ alkylene glycols; polyglycidyl ethers of phenol-formaldehyde novolac resins (epoxy novolac resins), alkyl substituted phenol-formaldehyde resins, phenol-hydroxybenzaldehyde resins, cresol-hydroxybenzaldehyde resins, dicyclopentadiene-phenol resins and dicyclopentadiene-substituted phenol resins; cycloaliphatic epoxy resins, and any combination thereof.

In one embodiment, suitable one or more non-rubber-modified epoxy resins include, for example, diglycidyl ethers of bisphenol A resins that are commercially available and among others sold by Olin under the designations D.E.R.® 330, D.E.R.® 331, D.E.R.® 332, D.E.R.® 383, D.E.R.® 661, D.E.R.® 662 and D.E.R.® 671 and Huntsman under the tradename Araldite GY 260.

In one embodiment, suitable one or more non-rubber-modified epoxy resins include, for example, diglycidyl ethers of polyglycols that are commercially available and sold by Olin under the designations D.E.R.® 732 and D.E.R.® 736.

In one embodiment, suitable one or more epoxy novolac resins include, for example, those that are commercially available and sold by Olin under the designations D.E.N.® 354, D.E.N.® 431, D.E.N.® 438 and D.E.N.® 439.

In one embodiment, suitable one or more non-rubber-modified epoxy resins include, for example, cycloaliphatic epoxy resins such as those described in U.S. Pat. No. 3,686,359, incorporated herein by reference in its entirety. Suitable cycloaliphatic epoxy resins include, for example, (3,4-epoxycyclohexyl-methyl)-3,4-epoxy-cyclohexane carboxylate, bis-(3,4-epoxycyclohexyl) adipate, vinylcyclohexene monoxide and mixtures thereof.

In one embodiment, suitable one or more non-rubber-modified epoxy resins include, for example, oxazolidone-containing compounds such as those described in U.S. Pat. No. 5,112,932. In addition, an advanced epoxy-isocyanate copolymer such as those commercially available and sold by Olin under the designations D.E.R. 592 and D.E.R. 6508 can be used.

In another embodiment, the one or more non-rubber-modified epoxy resins are one or more bisphenol-type epoxy resins or mixture thereof with up to 10 percent by weight of another type of epoxy resin. In one preferred embodiment, the one or more non-rubber-modified epoxy resins include bisphenol-A based epoxy resins and bisphenol-F based epoxy resins. In one preferred embodiment, the one or more non-rubber-modified epoxy resins include liquid bisphenol-A based epoxy resins and bisphenol-F based epoxy resins.

In one embodiment, the one or more non-rubber-modified epoxy resins have an epoxy equivalent weight of from 150 to 600 g/mol or more, or from 150 to 400 g/mol, or from 150 to 250 g/mol. In one embodiment, the one or more non-rubber-modified epoxy resins contain at least 10 weight percent, based on the total weight of the one or more non-rubber-modified epoxy resins, of a liquid non-rubber-modified epoxy resins such as a diglycidyl ether of a polyhydric phenol, e.g., bisphenol-A or bisphenol-F, having an epoxy equivalent weight of from 150 to 299 g/mol, or from 150 to 250 g/mol.

In one embodiment, the one or more non-rubber-modified epoxy resins contain at least 60 percent by weight of a liquid diglycidyl ether of a polyhydric phenol, e.g., bisphenol-A or bisphenol-F, having an epoxy equivalent weight of from 150 to 299 g/mol, or from 150 to 250 g/mol. In one embodiment, the one or more non-rubber-modified epoxy resins contain at least 70 percent by weight of a liquid diglycidyl ether of a polyhydric phenol, e.g., bisphenol-A or bisphenol-F, having an epoxy equivalent weight of from 150 to 299 g/mol, or from 150 to 250 g/mol. In one embodiment, the one or more non-rubber-modified epoxy resins are a mixture of at least one liquid diglycidyl ether of a polyhydric phenol, e.g., bisphenol-A or bisphenol-F, having an epoxy equivalent weight of from 150 to 299 g/mol, or from 150 to 250 g/mol, and at least one semi-solid diglycidyl ether of a polyhydric phenol, e.g., bisphenol-A or bisphenol-F, having an epoxy equivalent weight of from 150 to 299 g/mol, or from 150 to 250 g/mol. The mixture optionally may also contain up to 20%, or up to 10%, of one or more other epoxy resins.

In general, the one or more non-rubber-modified epoxy resins will constitute at least 20 weight percent, or at least 30 weight percent, or at least about 40 weight percent of the total weight of the one-component epoxy resin adhesive composition. In another embodiment, the one or more epoxy resins may constitute up to 80 weight percent or up 70 weight percent or up to 60 weight percent of the total weight of the one-component epoxy resin adhesive composition. In one embodiment, the one-component epoxy resin adhesive composition will constitute 20 to 80, or 30 to 60 weight percent of the total weight of the one-component epoxy resin adhesive composition.

In one embodiment, the one-component epoxy resin adhesive composition will constitute 20 to 80, or 30 to 60 weight percent, of the total weight of the one-component epoxy resin adhesive composition, of at least one liquid diglycidyl ether of a polyhydric phenol, e.g., bisphenol-A. In another embodiment, the one-component epoxy resin adhesive composition will constitute 0 to 40, or 2 to 15 weight percent of the total weight of the one-component epoxy resin adhesive composition, of at least one solid diglycidyl ether of a polyhydric phenol, e.g., bisphenol-A.

The one-component epoxy resin adhesive composition will further include one or more latent epoxy curing agents (b). A curing agent is consider to be "latent" for purposes of this invention if the adhesive, including all the components as set forth herein, exhibits a curing temperature of at least 60° C., or at least 80° C., or at least 100° C. or at least 140° C. In one embodiment, the adhesive, including all the components as set forth herein, exhibits a curing temperature as high as, for example, 180° C. The "curing temperature" refers to the lowest temperature at which the structural adhesive achieves at least 30% of its lap shear strength (DIN ISO 1465) at full cure within 2 hours. The lap shear strength at "full cure" is measured on a sample that has been cured for 30 minutes at 180° C., which conditions represent "full cure" conditions.

Any latent epoxy curing agent appropriate for a one-component epoxy resin adhesive composition may be used herein. In one embodiment, suitable latent epoxy curing agents include, for example, one or more of ureas, boron trichloride/amine and boron trifluoride/amine complexes, melamine, diallylmelamine, guanamines such as dicyandiamide, methyl guanidine, dimethyl guanidine, trimethyl guanidine, tetramethyl guanidine, methylisobiguanidine, dimethylisobiguanidine, tetramethylisbiguandidine, heptamethylisobiguanidine, hexamethylisobiguanidine, acetoguanamine and benzoguanamine, amino triazoles such as 3-amino-1,2,4-triazole, hydrazides such as adipic dihydrazide, stearic dihydrazide, and isophthalic dihydrazide, semicarbazide, cyanoacetamide, and aromatic polyamines such as diaminodiphenylsulphones. In one embodiment, the one or more latent epoxy curing agents is dicyandiamide.

In one embodiment, the one or more latent epoxy curing agents is at least one urea compound having one or more urea groups and a molecular weight per urea group of up to 250. In general, the urea compound can be of the structure:

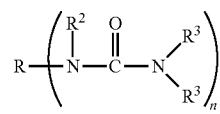

wherein n is 1 or more, R is a substituted or unsubstituted alkyl, cycloalkyl and/or aromatic radical, $R^2$ is hydrogen, unsubstituted alkyl, substituted alkyl, phenyl or substituted phenyl, and each $R^3$ is independently an alkyl, substituted alkyl, phenyl or substituted phenyl. R may be the residue, after removal of isocyanate groups, from a mono- or polyisocyanate compound. R may contain, for example, up to 20 carbon atoms, or up to 15 carbon atoms. In one embodiment, R, each $R^3$ and $R^2$ (if not hydrogen) are bonded to the adjacent nitrogen atom through an aliphatic carbon atom, n is 1 to 4, or 1, 2 or 3, or 2.

Representative examples of aromatic ureas include 3-phenyl-1,1-dimethylurea, 3-(p-chlorophenyl)-1,1-dimethylurea, 3-(3,4-dichlorophenyl)-1, and 1-dimethyl urea. Representative examples of other aromatic ureas include those corresponding to reaction products of an aromatic polyisocyanate with a dialkyl amine, e.g., 2,4'- and/or 4,4'-methylene bis (phenyl dimethyl urea) and 2,4- and/or 2,6-toluene bis (dimethyl urea). A commercially available aromatic substituted urea product is Omicure™ U-52, available from Emerald Performance Materials.

Representative examples of aliphatic ureas include tetraalkyl urea compounds in which the alkyl groups each independently have 1 to 12, or 1 to 2 carbon atoms, such as tetramethylurea and tetraethylurea. In one embodiment, an aliphatic urea corresponds to a reaction product of an aliphatic (including cycloaliphatic) isocyanate with a dialkyl amine, e.g., isophorone bis(dimethyl urea), cyclohexane bis(dimethyl urea), hexane-1,6-bis(dimethylurea), and 4,4'-methylene bis(cyclohexane dimethyl urea). A commercially available cycloaliphatic substituted urea product is Omicure™ U-35, available from Emerald Performance Materials.

The urea compound is believed to also function as a curing accelerator, i.e., a catalyst. Accordingly, it is not necessary to include a separate curing accelerator or catalyst in the adhesive composition of the invention. However, if an additional curing accelerator is desired, it can be any of those discussed above or as known in the art.

In one embodiment, the one or more latent epoxy curing agents is at least one urea compound discussed above, and one or more additional latent epoxy curing agents. For example, the one or more additional latent epoxy curing agents can be any of those discussed above.

In general, the one or more latent epoxy curing agents are used in an amount sufficient to cure the adhesive composition. Typically, a sufficient amount of the curing agent is provided to consume at least 80% of the epoxide groups present in the composition. A large excess over that amount needed to consume all of the epoxide groups is generally not needed. Accordingly, in one embodiment, the one or more latent epoxy curing agents can constitute at least 1.5 weight percent, or at least 1.75 weight percent or at least 2.0 weight percent of the total weight of the one-component epoxy resin adhesive composition. In another embodiment, the one or more latent epoxy curing agents constitute up to 15 weight percent, or up to 10 weight percent, or up to 8 weight percent of the total weight of the one-component epoxy resin adhesive composition.

The one-component epoxy resin adhesive composition will further include one or more toughening agents (c). In general, any toughening agent appropriate for a one-component epoxy resin adhesive composition may be used herein. In one embodiment, suitable one or more toughening agents include, for example, one or more polyurethane-containing toughening agents. The polyurethane-containing toughening agent is an elastomeric material that has terminal capped isocyanate groups, and made in a process that includes the steps of chain-extending a mixture of isocyanate-terminated compounds and then capping the remaining isocyanate groups of the chain-extended material.

The isocyanate-terminated compounds can include (i) at least one 1000 to 10,000 number average molecular weight isocyanate-terminated polyether and (ii) at least one 1000 to 10,000 number average molecular weight isocyanate-terminated diene polymer. The polyether portion of the isocyanate-terminated polyether may be a polymer of one or more of tetrahydrofuran (tetramethylene oxide), 1,2-butylene oxide, 2,3-butylene oxide, 1,2-propylene oxide and ethylene oxide, with polymers or copolymers of at least 70 weight percent, based on the total weight of the polymer or copolymer, of tetrahydrofuran, 1,2-butylene oxide, 2,3-butylene oxide and 1,2-propylene oxide being preferred. In one embodiment, a polymer of at least 80 weight percent tetrahydrofuran, based on the total weight of the polymer or copolymer is employed.

The isocyanate-terminated polyether is prepared by the reaction of an amine- or hydroxyl-terminated polyether with a polyisocyanate, at a ratio of at least 1.5 equivalents, or 1.8 to 2.5 equivalents or 1.9 to 2.2 equivalents, of polyisocyanate per equivalent of amine- and/or hydroxyl groups on the starting polyether. The starting polyether can have 2 to 3 amine and or hydroxyl groups per molecule. The polyisocyanate may have 2 isocyanate groups per molecule. The isocyanate-terminated polyether can have 2 to 3 isocyanate groups per molecule. The starting polyether can have a number average molecular weight of 900 to 8000, or 1500 to 6000 or 1500 to 4000. In one embodiment, the polyisocyanate has a molecular weight of up to 300.

The isocyanate-terminated diene polymer is prepared by the reaction of an amine- or hydroxyl-terminated diene polymer with a polyisocyanate, at a ratio of at least 1.5 equivalents, or 1.8 to 2.5 equivalents or 1.9 to 2.2 equivalents, of polyisocyanate per equivalent of amine- and/or hydroxyl groups on the starting diene polymer.

The starting diene polymer preferably has a glass transition temperature, prior to reaction with the polyisocyanate, of no greater than −20° C. and preferably no greater than −40° C. The diene polymer is a liquid homopolymer or copolymer of a conjugated diene, especially a diene/nitrile copolymer. The conjugated diene can be butadiene or isoprene. In one embodiment, the conjugated diene is butadiene and the preferred nitrile monomer is acrylonitrile. The rubbers can contain, in the aggregate, no more than 30 weight percent polymerized unsaturated nitrile monomer, and no more than about 26 weight percent polymerized nitrile monomer.

The starting diene polymer can have 2 to 3 amine and/or hydroxyl groups per molecule. The polyisocyanate can have 2 isocyanate groups per molecule. The isocyanate-terminated diene polymer can have 2 to 3 isocyanate groups per molecule. The starting diene polymer can have a number average molecular weight of 900 to 8000, or 1500 to 6000 or 2000 to 3000. In one embodiment, the polyisocyanate can have a molecular weight of up to 300.

The isocyanate-terminated polyether and isocyanate-terminated diene polymer can have aromatic isocyanate groups, but the isocyanate groups are usually aliphatic. When the isocyanate-terminated polymers are made in the process described above, the polyisocyanate may be an aromatic polyisocyanate, but it usually is an aliphatic polyisocyanate such as isophorone diisocyanate, 1,6-hexamethylene diisocyanate, hydrogenated toluene diisocyanate, and hydrogenated methylene diphenylisocyanate (H12MDI).

The isocyanate-terminated polyether and isocyanate-terminated diene polymer may be made separately and then blended. Alternatively, they are made simultaneously by blending an amine- or hydroxyl-terminated polyether and an amine- or hydroxyl-terminated diene polymer, each as described above, and reacting the blended materials with a polyisocyanate to form the mixture of isocyanate-terminated species directly.

The weight ratio of isocyanate-terminated polyether and isocyanate-terminated diene polymer may be, for example, 5:95 to 95:5 or 50:50 to 95:5 or 70:30 to 90:10.

The reaction to form the isocyanate-terminated polymers can be performed by combining the materials in the stated ratios and heating to 60 to 120° C., optionally in the presence of a catalyst for the reaction of isocyanate groups with the isocyanate-reactive groups of the polyether or diene polymer. The reaction is continued until the isocyanate content is reduced to a constant value, or to a target value, or until the amine- and or hydroxyl groups of the starting polyether or diene polymer are consumed.

If desired, branching can be introduced into the isocyanate-terminated polyether and/or isocyanate-terminated diene polymer. When they are made in a process such as described above, this can be done by adding a branching agent into the reaction between the polymeric starting materials and the polyisocyanate. The branching agent can be a polyol or polyamine compound having a molecular weight of up to 599, or from 50 to 500, and at least three hydroxyl, primary amino and/or secondary amino groups per molecule. If used, the branching agent generally constitutes no more than 10%, or no more than 5% or no more than 2% of the combined weight of the branching agent and the starting polymer (i.e., the amine- or hydroxyl-terminated polyether or diene polymer).

Suitable branching agents include, for example, polyols such as trimethylolpropane, glycerin, trimethylolethane, ethylene glycol, diethylene glycol, propylene glycol, dipropylene glycol, sucrose, sorbitol, pentaerythritol, triethanolamine, and diethanolamine, as well as alkoxylates thereof having a number average molecular weight of up to 599, or up to 500.

The mixture of isocyanate-terminated polyether and isocyanate-terminated diene polymer is chain extended to produce a chain extended, isocyanate-terminated prepolymer. Suitable chain extenders include, for example, polyol or polyamine compounds having a molecular weight of up to 749, or from 50 to 500, and two hydroxyl, primary amino and/or secondary amino groups per molecule. Representative examples of suitable chain extenders include aliphatic diols such as ethylene glycol, diethylene glycol, methylene glycol, propylene glycol, dipropylene glycol, tripropylene glycol, 1,4-butanediol, 1,6-hexane diol, and cyclohexanedimethanol; aliphatic or aromatic diamines such as ethylene diamine, piperazine, aminoethylpiperazine, phenylene diamine, and diethyltoluenediamine, and compounds having two phenolic hydroxyl groups such resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A.

The chain extension reaction is performed in the same general manner as the prepolymer-forming reaction. In general, a sufficient amount of the prepolymers are mixed with the chain extender to provide at least two equivalents of isocyanate groups per equivalent of isocyanate-reactive groups contributed by the chain extender. 1.5 to 4 or more, or 1.75 to 3 or 1.8 to 2.5 equivalents of isocyanate groups may be provided per equivalent of isocyanate-reactive groups contributed by the chain extender during the chain extension reaction.

The chain extension reaction is performed by combining the mixture of isocyanate-terminated polyether and isocyanate-terminated diene polymer with the chain extender, and subjecting the mixture to conditions under which the isocyanate-reactive groups of the chain extender react isocyanate groups of the isocyanate-terminated materials to form the chain-extended prepolymer.

The chain-extended prepolymer will be a mixture of materials. It will consist mainly of isocyanate-terminated polymers that correspond to two or more of the starting isocyanate-terminated polymers coupled together by residue(s) of the chain extender. A portion of the prepolymer molecules will have two or more polyether chains, corresponding to the polyether chains of the isocyanate-terminated polyether. A portion of the prepolymer molecules will have one or more polyether chains, corresponding to the polyether chains of the isocyanate-terminated polyether, and one or more diene polymer chains, corresponding to the diene polymer chains of the isocyanate-terminated diene polymer. There may be prepolymer molecules that have two more diene polymer chains, corresponding to the diene polymer chains of the isocyanate-terminated diene polymer. The chain-extended prepolymer may contain small quantities of unreacted starting materials, and/or of reaction products of one molecule of chain extender with only one molecule of isocyanate-terminated polyether or isocyanate-terminated diene polymer.

Conditions for the chain-extension reaction are generally as described with respect to the reaction of the amine- or hydroxyl-terminated polymer with the polyisocyanate.

The isocyanate groups of the chain-extended prepolymer are then capped by reaction with a capping group. Various types of capping groups are suitable including those described in, for example, U.S. Pat. Nos. 5,202,390, 5,278,257, and 7,615,595, U.S. Published Patent Application Nos. 2005-0070634, 2005-0209401, 2006-0276601 and 2010-0019539, WO 2006/128722, WO 2005/118734 and WO 2005/0070634, all incorporated herein by reference in their entireties.

In one embodiment, suitable capping agents include, for example, aliphatic, aromatic, cycloaliphatic, araliphatic and/or heteroaromatic monoamines that have one primary or secondary amino group. Examples of such capping compounds include monoalkyl amines such as methyl amine, ethyl amine, isopropyl amine, sec-butylamine, t-butyl amine; dialkyl amines such as dimethylamine, diethylamine, diisopropylamine, di-sec-butylamine, dihexylamine and dioctyl amine; cyclohexylamine or dicyclohexylamine wherein the cyclohexyl groups are optionally substituted with one or more alkyl groups; benzylamine and diphenylamine wherein the phenyl groups are optionally substituted with one or more alkyl groups; morpholine; N-alkylpiperadines and imidazols having an amine hydrogen atom.

In one embodiment, suitable capping agents include, for example, phenolic compounds, including monophenols, polyphenols and aminophenols. Examples of monophenols include phenol, alkyl phenols that contain one or more alkyl groups that each may contain from 1 to 30 carbon atoms, naphthol, a halogenated phenol, cardanol, or naphthol. Suitable polyphenols contain two or more phenolic hydroxyl groups per molecule and include resorcinol, catechol, hydroquinone, bisphenol, bisphenol A, bisphenol AP (1,1-bis (4-hydroxylphenyl)-1-phenyl ethane), bisphenol F, bisphenol K, bisphenol M, tetramethylbiphenol and o,o'-diallyl-bisphenol A, as well as halogenated derivatives thereof. Suitable aminophenols are compounds that contain at least one primary or secondary amino group and one phenolic hydroxyl group. The amino group can be bound to a carbon atom of an aromatic ring. Examples of suitable aminophenols include 2-aminophenol, 4-aminophenol, various aminonaphthols, and the like. In one embodiment, the phenolic compounds include the monophenols and aminophenols.

In one embodiment, suitable capping agents include, for example, benzyl alcohol, which may be substituted with one or more alkyl groups on the aromatic ring.

In one embodiment, suitable capping agents include, for example, hydroxy-functional acrylate or methacrylate compounds such as 2-hydroxyethylacrylate, 2-hydroxypropylacrylate, 4-hydroxybutylacrylate, 2-hydroxy-butylacrylate, 2-aminopropylacrylate, 2-hydroxyethylmethacrylate, 2-hydroxypropyl-methacrylate, 4-hydroxybutylmethacrylate and 2-hydroxybutylmethacrylate.

In one embodiment, suitable capping agents include, for example, thiol compounds such as alkyl thiols having 2 to 30, or 6 to 16, carbon atoms in the alkyl group, including dodecanethiol.

In one embodiment, suitable capping agents include, for example, alkyl amide compounds having at least one amine hydrogen such as acetamide and N-alkylacetamide.

In one embodiment, suitable capping agents include, for example, a ketoxime.

In some embodiments, at least 90%, or at least 95% or at least 98%, or up to 100% of the isocyanate groups of the prepolymer are capped with capping agents of one or more of monophenols and aminophenols. In such embodiments any remaining uncapped isocyanate groups may be capped with another type of capping agent.

The capping reaction can be performed under the general conditions described already, i.e., by combining the materials in the stated ratios and allowing them to react at room temperature or an elevated temperature such as 60 to 120° C., optionally in the presence of a catalyst for the reaction of isocyanate groups with the isocyanate-reactive groups of the capping agent. The reaction is continued until the isocyanate content is reduced to a constant value, which is less than 0.1% by weight. In addition, fewer than 3%, or fewer than 1%, of the isocyanate groups may remain uncapped.

The resulting toughening agent may have a number average molecular weight of at least 3000, or at least 4,000 to 35,000, or up to 20,000, or up to about 15,000, as measured by Gel permeation chromatography (GPC), taking into account only those peaks that represent molecular weights of 1000 or more.

The polydispersity (ratio of weight average molecular weight to number average molecular weight) of the toughening agent is suitably from 1 to 4, or from 1.5 to 2.5. The toughening agent suitably contains, on average, from 1.5, or from 2.0, to 6, or up to 4, or up to 3 or up to 2.5, capped isocyanate groups per molecule. In one embodiment, a prepolymer contains an average of from 1.9 to 2.2 capped isocyanate groups per molecule.

In general, the one or more toughening agents will constitute at least 0.5 weight percent or at least 8 weight percent or at least 10 weight percent of the total weight of the one-component epoxy resin adhesive composition. In one embodiment, the one or more toughening agents will constitute up to 40 weight percent, or up to 30 weight percent or up to 25 weight percent of the total weight of the one-component epoxy resin adhesive composition.

The one-component epoxy resin adhesive composition will further include zinc oxide nanoparticles (d). In general, the zinc oxide nanoparticles for use herein can have an average particle size of less than 250 nanometers (nm) or less than 200 nm or less than 150 nm or less than 100 nm or less than 50 nm. In one embodiment, the zinc oxide nanoparticles for use herein can have an average particle size of at least 10 nm or at least 20 nm or at least 25 nm or at least 30 nm or at least 35 nm. The zinc oxide nanoparticles vary not only in size, but also in shape, and crystallinity as well as being amorphous. For example, the zinc oxide nanoparticles can be of any convenient shape such as, for example, spheres, cones, ovals, cylindrical, cubes, monoclinic, parallelolipids, and irregular shaped structures. The zinc oxide nanoparticles can be in dry form or dispersed in a solution. Zinc oxide nanoparticles for use herein are commercially available from, for example, Grillo Zinkoxid GmbH under the tradename Grillo NANO Tec®, and Elementis under the tradename Nanox 200.

In general, the zinc oxide nanoparticles will be present in the one-component epoxy resin adhesive composition in an amount of from 0.1 to 5 weight percent or from 0.2 to 4 weight percent or from 0.3 to 2.5 weight percent, based on the total weight of the one-component epoxy resin adhesive composition.

If desired, the one-component epoxy resin adhesive composition may contain various other optional ingredients, in addition to those described above.

The one-component epoxy resin adhesive composition may further contain one or more rubber components in addition to the one or more toughening agents described above. In one embodiment, the rubber component includes, for example, a liquid rubber, such as one having two or more epoxide-reactive groups, e.g., amino or carboxyl groups. If desired, at least a portion of the liquid rubber has a glass transition temperature ($T_g$) of −40° C. or lower, or −50° C. or lower, as measured by differential scanning calorimetry. Such a liquid rubber component may be entirely or partially reacted with an epoxy resin to form a rubber-modified epoxy resin that has epoxy groups.

In addition, such a liquid rubber can be a homopolymer or copolymer of a conjugated diene, especially a diene/nitrile copolymer. For example, the conjugated diene rubber can be butadiene or isoprene. In one embodiment, the conjugated diene rubber is butadiene and the nitrile monomer is acrylonitrile thus forming butadiene-acrylonitrile copolymers. The rubbers can contain, in the aggregate, no more than 30 weight percent polymerized unsaturated nitrile monomer, or no more than about 26 weight percent polymerized nitrile monomer. The liquid rubber may contain from 1.5, or from 1.8, or up to 2.5, or up to 2.2, of epoxide-reactive terminal groups per molecule, on average. In one embodiment, the rubber component is a carboxyl-terminated rubber. The molecular weight ($M_n$) of the rubber is suitably from 2000 to 6000, or from 3000 to 5000. Suitable carboxyl-functional butadiene and butadiene/acrylonitrile rubbers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

Other suitable rubbery materials include amine-terminated polyethers, fatty acids (which may be dimerized or oligomerized), and elastomeric polyester.

In one embodiment, the rubber component includes, for example, a core-shell rubber. Representative examples of liquid rubber and core-shell rubber components are disclosed in U.S. Pat. Nos. 7,642,316 and 7,625,977, incorporated herein by reference in their entireties. Generally, a core-shell rubber is a particulate material having a rubbery core. In one embodiment, the rubbery core can have a $T_g$ of less than −20° C., or less than −50° C. or less than −70° C. In one embodiment, the $T_g$ of the rubbery core may be below −100° C. The core-shell rubber also has at least one shell portion that has a $T_g$ of at least 50° C. The core of the core-shell rubber may be a polymer or copolymer of a conjugated diene such as butadiene, or a lower alkyl acrylate such as n-butyl-, ethyl-, isobutyl- or 2-ethylhexylacrylate, or may be a silicone rubber. The shell polymer, which is optionally chemically grafted or crosslinked to the rubber core, can be polymerized from at least one lower alkyl methacrylate such as methyl-, ethyl- or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000. Examples of useful core-shell rubbers include those described in EP 1 632 533 A1 and those sold by Kaneka Corporation under the designation Kaneka Kane Ace, including, for example, Kaneka Kane Ace MX 156 and Kaneka Kane Ace MX 120 core-shell rubber dispersions.

The total rubber content of the one-component epoxy resin adhesive composition according to the present invention can range from as little as 0 weight percent to as high as 20 weight percent, or up to 15 weight percent or up to 5 weight percent, based on the total weight of the one-component epoxy resin adhesive composition. No portion of the toughening agent discussed above is considered in calculating total rubber content.

The one-component epoxy resin adhesive composition may further contain one or more silicone toughening agents.

The one-component epoxy resin adhesive composition may further contain one or more reinforcing agents. Suitable one or more reinforcing agents include, for example, calcium carbonate, calcium oxide, talc, carbon black, textile fibers, glass particles or fibers, aramid pulp, boron fibers, carbon fibers, mineral silicates, mica, powdered quartz, hydrated aluminum oxide, bentonite, various alumina-silicates including clays such as wollastonite and kaolin, fumed silica, silica aerogel, polyurea compounds, polyamide compounds and metal powders such as aluminum powder or iron powder. In one embodiment, a reinforcing agent is a microballoon having an average particle size of up to 200 microns and density of up to 0.2 g/cc. The particle size of the microballoon can be from 25 to 150 microns and the density from 0.05 to 0.15 g/cc. Heat expandable microballoons which are suitable for reducing density include those commercially available from Dualite Corporation under the trade designation Dualite™, and from Akzo Nobel under the trade designation Expancel™.

All or part of the reinforcing agent may be in the form of fibers having a diameter of 1 to 50 μm (D50, as measured by microscopy) and an aspect ratio of 6 to 20. The diameter of the fibers may be 2 to 20 μm or 2 to 10 μm, and the aspect ratio may be 8 to 20 or 8 to 16. The diameter of the fiber is taken as that of a circle having the same cross-sectional area as the fiber. The aspect ratio of the fibers may be 6 or more, such as 6 to 25, 6 to 20, 8 to 20 or 8 to 15.

Alternatively, all or part of the reinforcing agent may be in the form of low aspect ratio particles having an aspect ratio of 5 or less and a longest dimension of up to 100 μm, or up to 25 μm.

In general, the one or more reinforcing agents can be present in the one-component epoxy resin adhesive composition in an amount of from 1 to 40 weight percent, based on the total weight of the one-component epoxy resin adhesive composition. In one embodiment, the one or more reinforcing agents can be present in the one-component epoxy resin adhesive composition in an amount of at least 5 weight percent or at least 7.5 weight percent, based on the total weight of the one-component epoxy resin adhesive composition. In one embodiment, the one or more reinforcing agents can be present in the one-component epoxy resin adhesive composition in an amount up to 25 weight percent or up to 20 weight percent, based on the total weight of the one-component epoxy resin adhesive composition.

The one-component epoxy resin adhesive composition may further contain one or more epoxy diluents. Suitable one or more epoxy diluents include, for example, methyl ethyl ketone (MEK), dimethylformamide (DMF), ethyl alcohol (EtOH), propylene glycol methyl ether (PM), propylene glycol methyl ether acetate (DOWANOL™ PMA), dibutyl phthalate, dioctyl phthalate, styrene, low molecular weight polystyrene, styrene oxide, allyl glycidyl ether, phenyl glycidyl ether, butyl glycidyl ether, vinylcyclohexene oxide, neopentylglycol diglycidyl ether, butanediol diglycidyl ether, hexanediol diglycidyl ether, diethylene glycol diglycidyl ether, dipropylene glycol diglycidyl ether, poly(propylene glycol) diglycidyl ether, thiodiglycol diglycidyl ether, maleic anhydride, epsilon-caprolactam, butyrolactone, acrylonitrile, and any combination thereof.

In general, the one or more epoxy diluents can be present in the one-component epoxy resin adhesive composition in an amount of 0 to 10 weight percent, based on the total weight of the one-component epoxy resin adhesive composition.

The one-component epoxy resin adhesive composition according to the present invention can further contain other additives such as dimerized fatty acids, diluents, plasticizers, extenders, pigments and dyes, fire-retarding agents, thixotropic agents, expanding agents, flow control agents, adhesion promoters and antioxidants. Suitable expanding agents include both physical and chemical type agents. The one-component epoxy resin adhesive composition may also contain a thermoplastic powder such as polyvinylbutyral or a polyester polyol, as described in WO 2005/118734.

The one-component epoxy resin adhesive composition according to the present invention is formed into a layer at a bondline between two substrates to form an assembly, and the adhesive layer is then cured at the bondline to form an adhesive bond between the two substrates. The adhesive can be applied to the substrates by any convenient technique. For example, it can be applied cold or be applied warm if desired. In addition, it can be applied manually and/or robotically, using for example, a caulking gun, other extrusion apparatus, or jet spraying methods. Once the adhesive composition is applied to the surface of at least one of the substrates, the substrates are contacted such that the adhesive is located at a bondline between the substrates.

After application, the adhesive composition is cured by heating it to at or above its curing temperature. Generally, this temperature is at least 60° C., or from 80° C. or above, or from 140° C. or above. In one embodiment, the temperature is 180° C. or less.

The one-component epoxy resin adhesive composition according to the present invention can be used to bond a variety of substrates together including wood, metal, coated metal, aluminum, a variety of plastic and filled plastic substrates, and fiberglass. In one preferred embodiment, the adhesive is used to bond parts of automobiles together or to bond automotive parts onto automobiles. Such parts can be steel, coated steel, galvanized steel, aluminum, coated aluminum, plastic and filled plastic substrates. In one embodiment, a substrate is a metal substrate having a zinc-containing layer thereon. In one embodiment, a substrate is a steel substrate having a zinc-containing layer thereon.

In one embodiment, the one-component epoxy resin adhesive composition according to the present invention is used to bond a metal substrate having a zinc-containing layer thereon to a second substrate. The second substrate can be any substrate including wood, metal, coated metal, aluminum, a variety of plastic and filled plastic substrates, and fiberglass. In one embodiment, a second substrate is a metal substrate not having a zinc layer thereon.

Further handing may include, for example, transporting the assembly to a downstream work station, and further manufacturing steps which might include joining the assembly to one or more other components, various shaping and/or machining steps, the application of a coating, and the like. The completion of the cure can take place during and/or after such additional handling steps.

Molecular weights as described herein are number average molecular weights which may be determined by Gel Permeation Chromatography (also referred to as GPC).

The following examples are provided to illustrate the disclosed compositions, but are not intended to limit the scope thereof. All parts and percentages are by weight unless otherwise indicated.

The following designations, symbols, terms and abbreviations are used in the Examples below:

Araldite® GY 260 is a liquid Bisphenol A based epoxy resin having an epoxy equivalent weight of about 190 g/mol, available from Huntsman D.E.R. 671 is a semi-solid Bisphenol A based epoxy resin having an epoxy equivalent weight of about 240 g/mol, available from Olin Corporation.

Araldite® DY-P is a monoglycidylether of p-tert. butylphenol, available from Huntsman.

Toughener A is an elastomeric toughener containing blocked isocyanate groups. It is prepared by mixing 57.58 parts of a 2000 molecular weight polytetrahydrofuran and 14.39 parts of a 2800 molecular weight hydroxyl-terminated polybutadiene polymer at 120° C., cooling the mixture to 60° C., adding 11.54 parts of hexamethylene diisocyanate and a tin urethane catalyst and heating the resulting reaction mixture to 85° C. for 45 minutes under nitrogen. Then, 5.74 parts of o,o'-diallylbisphenol A are added, and the mixture is stirred for 120 minutes under vacuum in a 100° C. bath. 10.58 parts of cardanol are added and the mixture is stirred for 240 minutes under vacuum in a 105° C. bath.

Omicure U-52M is a 4,4'-methylene bis(phenyl dimethyl urea), available from Emerald Performance Products.

Omicure U-35 is an isophorone bis(dimethylurea), available from Emerald Performance Products.

Amicure CG 120 G is a dicyandiamide curing agent, available from Air Products.

Araldite DW0133 is a red colorant, available from Huntsman.

3M Glass Bubbles K25 are hollow glass spheres, available from 3M.

Chaux vive is calcium oxide, available from Lhoist.

AEROSIL R 208 is a hydrophobic fumed silica, available from Evonik Industries.

RAM 1087 is a tris(diethylene glycol methylether) silyl propyleneglycidylether, available from Huntsman.

Grillo NANO Tec® are zinc oxide nanoparticles, available from Grillo Zinkoxid GmbH.

Nanopox A 410 are $SiO_2$ nanoparticles, available from Evonik Industries.

Dynasilan GLYEO is 3-Glycidyloxypropyltriethoxysilane, available from Evonik Industries

COMPARATIVE EXAMPLES 1-4 AND EXAMPLES 1-3

The adhesive compositions of Comparative Examples 1-4 and Examples 1-3 are prepared by blending the ingredients as set forth below in Table 1.

greased by dipcoating in a solution of heptane/Anticorit PL 3802-39S (9/1).

Lap shear test specimens: The adhesive composition was applied to the strips. Glass beads (0.3 mm) were sprinkled onto the adhesive layer before overlaying the test strips; preferably 10 mm overlap. Metal clips were used to hold the two strips together during the prebaking cycle at 150° C. for 45 min. The specimens are e-coated according to a standard e-coat process. All coupon/adhesive assemblies were cured to completion after the e-coat process in an oven at 180° C. for 30 minutes.

Impact peel test specimens: The adhesive composition was applied to the strips. A 0.2 mm thick PTFE foil and a metal wire (thickness 0.2 mm) were used as spacers between both strips to adjust the adhesive layer to 0.2 mm. The specimens for impact peel testing have ISO 11343 test geometry (30 mm overlay, 20 mm width). Metal clips were used to hold the two strips together during the baking cycle. All coupon/adhesive assemblies were cured in an oven at 180° C. for 30 minutes. For impact peel testing, specimens were subjected to 90 J impact load at a drop weight speed of 2 m/s. Impact peel strength was measured at average impact load at plateau using an Zwick-Roell impact tester.

Testing

Test samples for tensile strength, elongation and elastic modulus measurements are made by curing a portion of each sample for 30 minutes at 180° C. Test specimens are cut from the cured samples and evaluated according to DIN EN ISO 527-1.

Impact peel testing is performed for each adhesive sample. The test coupons for the impact peel testing are 90 mm×2.0 mm with a bonded area of 30×20 mm. The adhesive sample is then applied to the bond area of a 0.8 mm-thick DX56D+Z100MB hot dipped zinc coated steel coupon. A

TABLE 1

|  | Comp. Ex. 1 | Comp. Ex. 2 | Comp. Ex. 3 | Comp. Ex. 4 | Ex. 1 | Ex. 2 | Ex. 3 |
| --- | --- | --- | --- | --- | --- | --- | --- |
| Araldite GY 260, wt. % | 34.50 | 33.75 | 33.00 | 31.50 | 34.05 | 33.60 | 32.70 |
| DER 671, wt. % | 9.50 | 9.50 | 9.50 | 9.50 | 9.50 | 9.50 | 9.50 |
| Araldite DY-P, wt. % | 2.00 | 2.00 | 2.00 | 2.00 | 2.00 | 2.00 | 2.00 |
| Amicure CG 120 G, wt. % | 3.65 | 3.65 | 3.65 | 3.65 | 3.60 | 3.55 | 3.45 |
| Toughener A, wt. % | 20.00 | 20.00 | 20.00 | 20.00 | 20.00 | 20.00 | 20.00 |
| Dynasilan GLYEO, wt. % | 0.80 | 0.80 | 0.80 | 0.80 | 0.80 | 0.80 | 0.80 |
| Aerosil 208, wt. % | 5.50 | 5.50 | 5.50 | 5.50 | 5.50 | 5.50 | 5.50 |
| Omicure U35, wt. % | 0.40 | 0.40 | 0.40 | 0.40 | 0.40 | 0.40 | 0.40 |
| Omicure U52, wt. % | 0.40 | 0.40 | 0.40 | 0.40 | 0.40 | 0.40 | 0.40 |
| Chaux Vive, wt. % | 6.00 | 6.00 | 6.00 | 6.00 | 6.00 | 6.00 | 6.00 |
| Hollow Glass Spheres K25, wt. % | 0.75 | 0.75 | 0.75 | 0.75 | 0.75 | 0.75 | 0.75 |
| Wollastonite, wt. % | 16.00 | 16.00 | 16.00 | 16.00 | 16.00 | 16.00 | 16.00 |
| Grillo NANO Tec, wt. % (ZnO Nanoparticle content) | — | — | — | — | 0.50 | 1.0 | 2.0 |
| Nanopox A 410, wt. % ($SiO_2$ Nanoparticle content) | — | 1.25 (0.5) | 2.50 (1.0) | 5.00 (2.0) | — | — | — |
| Colorant, wt. % | 0.50 | 0.50 | 0.50 | 0.50 | 0.50 | 0.50 | 0.50 |

Sample Preparation

Metal strips of given steel grade HC 420 LAD+Z100 (i.e., a steel substrate having a zinc-containing layer thereon) were cleaned with heptane in an ultrasonic bath and re- 0.8 mm-thick DCO4A+ZE75/75 electrolytically zinc coated coupon is placed into contact with the adhesive, and the assembly squeezed under a weight of about 2 kg to prepare each test specimen, with spacers present to maintain an adhesive layer thickness of 0.2 trim. The assembled test specimens are fixed with clamps in position and then cured at 180° C. for 30 minutes. The impact peel testing is performed in accordance with the ISO 11343 wedge impact method. Testing is performed at an operating speed of 2 m/sec with samples at a temperature of 23° C.

Lap shear specimens are made using coupons of a 1.2 mm-thick HC420LAD+Z100 hot dipped zinc coated steel coupon. The bonded area in each case is 25×10 mm, and the adhesive layer thickness is 0.3 mm. The test specimens are precured at 150° C. for 45 min and then fully cured for 30 minutes at 180° C. and evaluated for lap shear strength in accordance with DIN ISO 1465. Testing is performed at 23° C. and a test speed of 10 min/minute. The failure mode after lap shear testing is analyzed and categorized by cohesive failure (CF), and adhesive failure (AF) as well as corrosion of the metal surface (C) after cyclic corrosion testing as described below. In the case of cohesive failure, CF is the percentage of the adhesive which is visible on both sides of the broken specimen. In the case of adhesive failure, AF is the percentage of the adhesive which is visible on one side of the broken specimen.

A cyclic corrosion test has been conducted according to the test cycle specified by Volkswagen (VW) as PV 1210 for 90 cycles using 5 lap shear specimens on HC420LAD+ Z100, thickness 1.2 mm. The specimens are prepared and analyzed as described above initially as well as after 90 cycles PV 1210.

Viscosity and yield stress are measured on a Bohlin CS-50 rheometer, C/P 20, up/down 0.1-20 $s^{-1}$, with data evaluated according to the Casson model.

The results are set forth below in Table 2.

The data show that the aging performance of a bonded joint is significantly improved by the addition of zinc oxide nanoparticles into the one-component epoxy resin adhesive composition according to the present invention. For example, the adhesive composition of Comparative Example 1 containing no zinc nanoparticles has a loss of lap shear strength in artificial aging of 60% after 90 cycles as compared to the adhesive composition of Example 1 containing 0.5% zinc oxide nanoparticles which yielded a loss of lap shear strength of 37% after 90 cycles. The adhesive composition of Examples 2 and 3 containing 1.0% and 2.0% zinc oxide nanoparticles, respectively, yielded similar lap shear strength decays as the adhesive composition of Example 1, i.e., 40% and 38%, respectively.

In addition, the adhesive compositions of Comparative Examples 2-4 containing silicon dioxide nanoparticles resulted in a loss of lap shear strength of at least 51%. Thus, the addition of the zinc oxide nanoparticles to the adhesive composition resulted in a significant improvement in lap shear strength decays as compared to the adhesive compositions of Comparative Examples 1-4. Likewise, the adhesive composition of Examples 1-3 showed a significantly higher residual lap shear strength and failure mode after 90 cycles than the adhesive composition of Comparative Examples 1-4.

What is claimed is:

1. A one-component epoxy resin adhesive composition comprising:
(a) one or more non-rubber-modified epoxy resins;
(b) one or more latent epoxy curing agents, wherein the one or more latent epoxy curing agents comprises a

TABLE 2

|  | Comp. Ex. 1 | Comp. Ex. 2 | Comp. Ex. 3 | Comp. Ex. 4 | Ex. 1 | Ex. 2 | Ex. 3 |
| --- | --- | --- | --- | --- | --- | --- | --- |
| Lap shear strength, [MPa] initial | 35.3 | 32.0 | 33.3 | 32.9 | 31.6 | 30.0 | 30.2 |
| Lap shear strength, [MPa] 60 cycles PV 1210 | 21.0 | 22.5 | 21.8 | 24.6 | 23.4 | 24.0 | 22.5 |
| Lap shear strength decay after 60 cycles PV 1210 | 40% | 30% | 35% | 25% | 25% | 20% | 26% |
| Failure mode after 60 cycles PV 1210 (CF/AF/C) | 95/5/0 | 85/15/0 | 80/20/0 | 90/10/0 | 90/10/0 | 95/5/0 | 90/10/0 |
| Lap shear strength [MPa] after 90 cycles PV 1210 | 14.2 | 13.8 | 15.6 | 16.1 | 19.8 | 18.2 | 18.2 |
| Lap shear strength decay after 90 cycles PV 1210 | 60% | 57% | 53% | 51% | 37% | 40% | 38% |
| Failure mode after 90 cycles PV 1210 (CF/AF/C) | 65/35/0 | 75/25/0 | 75/25/0 | 75/25/0 | 90/10/0 | 85/15/0 | 85/15/0 |
| Impact peel resistance, N/mm DX 56 Z/DC 04 ZE | 35.0 | 34.6 | 36.0 | 36.2 | 39.2 | 40.9 | 38.6 |
| E-Modulus, MPa | 2032 | — | 2128 | 2157 | — | 2030 | 2014 |
| Tensile Strength, MPa | 32.9 | — | 30.9 | 32.9 | — | 29.5 | 30.5 |
| Elong. at break, % | 7.5 | — | 6.5 | 6.4 | — | 5.4 | 4.7 |
| Yield stress, 45° C., Pa | 77 | 69 | 71 | 68 | 72 | 75 | 73 |
| Plastic Viscosity, 45° C., Pa-s | 416 | 351 | 318 | 320 | 352 | 366 | 361 | dicyanamide and one or more urea compounds having one or more urea groups and a molecular weight per urea group of up to 250;
(c) one or more toughening agents; and
(d) 0.1 to 5 wt % zinc oxide nanoparticles, wherein the zinc oxide nanoparticles have an average particle size from 10 nm to 100 nm.

2. The one-component epoxy resin adhesive composition according to claim 1, wherein the one or more non-rubber-modified epoxy resins comprise one or more liquid non-rubber-modified epoxy resins.

3. The one-component epoxy resin adhesive composition according to claim 2, wherein the one or more liquid non-rubber-modified epoxy resins have an epoxy equivalent weight of from 150 to 299 g/mol.

4. The one-component epoxy resin adhesive composition according to claim 1, wherein the one or more non-rubber-modified epoxy resins comprise at least 60% by weight of a liquid diglycidyl ether of a polyhydric phenol having an epoxy equivalent weight of from 150 to 299 g/mol.

5. The one-component epoxy resin adhesive composition according to claim 1, wherein the one or more urea compounds comprise at least one of isophorone bis(dimethyl urea), 2,4'- and/or 4,4'-methylene bis(phenyl dimethyl urea) and 2,4- and/or 2,6-toluene bis(dimethyl urea).

6. The one-component epoxy resin adhesive composition according to claim 1, wherein the one or more toughening agents comprise a reactive elastomeric toughener having capped isocyanate groups, wherein the reactive elastomeric toughener comprises a chain-extended and then isocyanate-capped mixture of (i) a 1000 to 10,000 number average molecular weight isocyanate-terminated polyether and (ii) a 1000 to 10,000 number average molecular weight isocyanate-terminated diene polymer.

7. The one-component epoxy resin adhesive composition according to claim 1, comprising
(a) at least 20 weight percent, based on the total weight of the adhesive composition, of the one or more non-rubber-modified epoxy resins;
(b) the one or more latent epoxy curing agents in an amount sufficient to cure the adhesive composition;
(c) 0.5 to 40 weight percent, based on the total weight of the adhesive composition, of the one or more toughening agents; and
(d) 0.1 to 5 weight percent, based on the total weight of the adhesive composition, of the zinc oxide nanoparticles.

8. The one-component epoxy resin adhesive composition according to claim 1, further comprising a core shell rubber.

9. A method comprising:
(a) applying a one-component epoxy resin adhesive composition to at least a portion of a one substrate, wherein the one-component epoxy resin adhesive composition comprises:
(i) one or more non-rubber-modified epoxy resins;
(ii) one or more latent epoxy curing agents, wherein the one or more latent epoxy curing agents comprises a dicyanamide and one or more urea compounds having one or more urea groups and a molecular weight per urea group of up to 250;
(iii) one or more toughening agents; and
(iv) 0.1 to 5 wt % zinc oxide nanoparticles, wherein the zinc oxide nanoparticles have an average particle size of from 10 nm to 100 nm,
(b) contacting a second substrate with the first substrate; and
(c) curing the one-component epoxy resin adhesive composition to form an adhesive bond between the first and second substrates.

10. The method according to claim 9, wherein the one or more non-rubber-modified epoxy resins comprise one or more liquid non-rubber-modified epoxy resins.

11. The method according to claim 10, wherein the one or more liquid non-rubber-modified epoxy resins have an epoxy equivalent weight of from 150 to 299 g/mol.

12. The method according to claim 9, wherein the one or more toughening agents comprises a reactive elastomeric toughener having capped isocyanate groups, which reactive elastomeric toughener includes a chain-extended and then isocyanate-capped mixture of (i) a 1000 to 10,000 number average molecular weight isocyanate-terminated polyether and (ii) a 1000 to 10,000 number average molecular weight isocyanate-terminated diene polymer.

13. The method according to claim 9, wherein the one-component epoxy resin adhesive composition comprises
(a) at least 20 weight percent, based on the total weight of the adhesive composition, of the one or more non-rubber-modified epoxy resins;
(b) the one or more latent epoxy curing agents in an amount sufficient to cure the adhesive composition;
(c) 0.5 to 40 weight percent, based on the total weight of the adhesive composition, of the one or more toughening agents; and
(d) 0.1 to 5 weight percent, based on the total weight of the adhesive composition, of the zinc oxide nanoparticles.

14. The method according to claim 9, wherein the first substrate is a metal substrate and the second substrate is a metal substrate having a zinc-containing layer thereon.

* * * * *